Patented Jan. 23, 1951

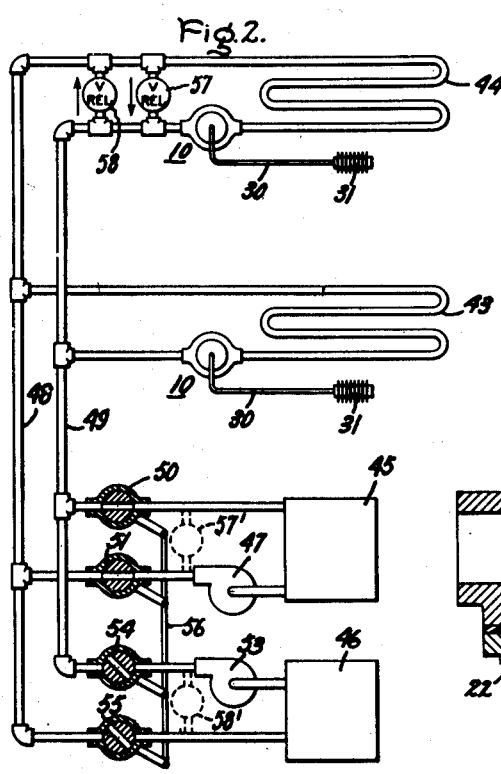
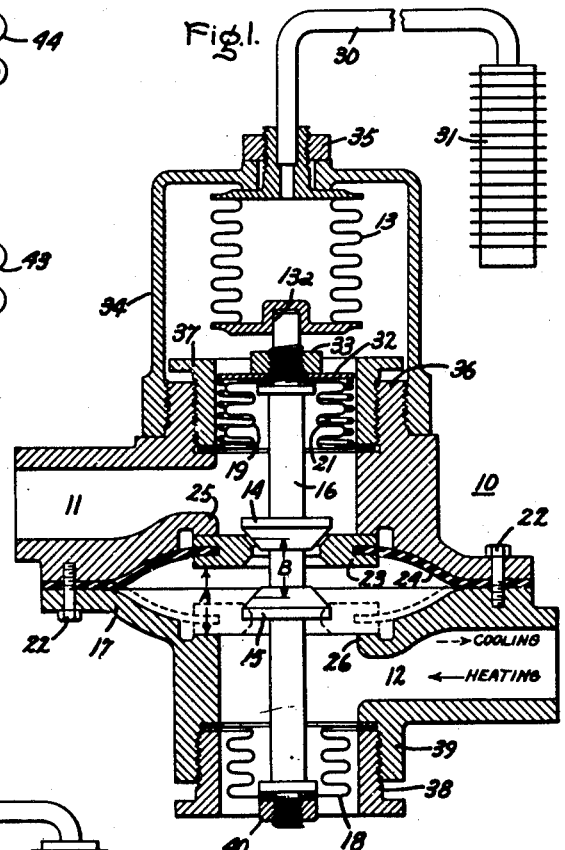
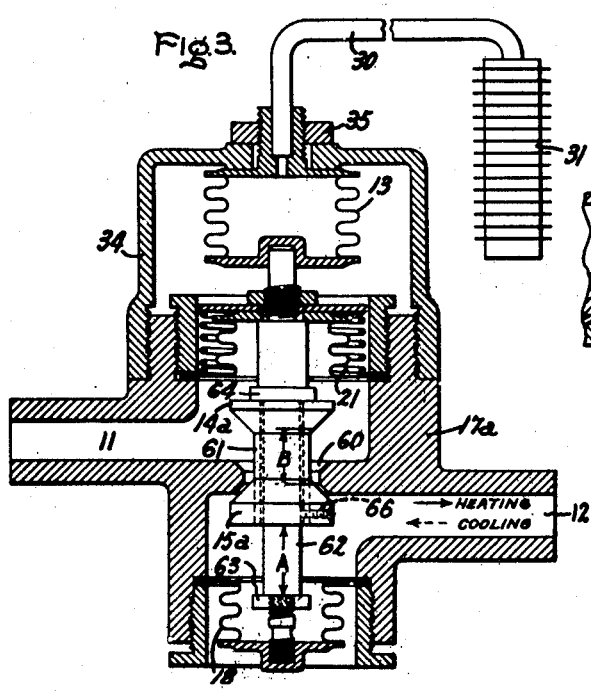
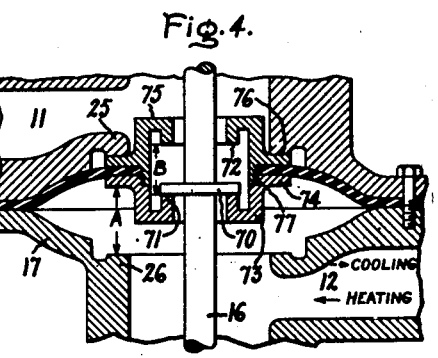
Inventor:
William L. Knaus,
by Edwin Z. Rich
His Attorney.

2,539,194

UNITED STATES PATENT OFFICE 2,539,194

REVERSE FLOW RESPONSIVE AUTOMATIC REVERSE MODULATION VALVE SYSTEM

William L. Knaus, Upper Montclair, N. J., assignor to General Electric Company, a corporation of New York Application May 13, 1947, Serial No. 747,760

14 Claims. (Cl. 236—1)

1

The invention relates to automatic condition responsive flow modulation valve systems, particularly thermostatically controlled heating and cooling medium flow modulation valve systems of the reversible type such as disclosed and claimed in the Crago Patents 2,121,625 and 2,495,226 and the Levine Patent 2,470,503, all assigned to the present assignee.

The principal object is to provide correlated valve and system improvements for reversing the automatic condition responsive valve flow modulation by reversal of the direction of flow through the system.

The reverse flow responsive reverse modulation valve and system improvements of the present invention, although not limited thereto, are particularly useful in a room heating and cooling medium circulating system, for enabling automatic thermostatic valves to oppositely modulate the flow of heating and cooling medium to the room heat exchange units upon flow thereof in opposite directions through the system so as to increase the flow of heating medium, but decrease the opposite flow of cooling medium upon a decrease in room temperature and vice-versa.

Another object is to provide improved reverse flow responsive valve modulation reversing and interlocking mechanisms that will automatically shift the automatic condition responsive modulation range of the valve upon reversal of the flow modulation. Thus in a thermostatic heating and cooling reverse modulation valve of the character indicated above, the heating modulation range of the valve may be separate from and lower than the reverse cooling modulation range.

Further objects and advantages of the present invention will appear in the following description of the accompanying drawing in which Fig. 1 is a sectional view of a reverse flow responsive automatic valve modulation reversing mechanism embodying the improvements of the present invention in the preferred form; Fig. 2 is a schematic illustration of an improved heating and cooling medium circulating system having the temperature controlling heating and cooling units under the automatic control of the improved reverse modulation valve shown in Fig. 1 and Figs. 3 and 4 are sectional views of modified forms of flow reversal responsive valve modulation reversing mechanism embodying the invention.

The improved automatic reverse flow responsive reverse modulation valve mechanism shown in Fig. 1 is indicated collectively by the reference

2 character 10 and reversely modulates the flow between the flow passage 11 formed in one side of the split valve casing 17 and the communicating flow passage 12 formed in the opposite side of the valve casing 17 dependent upon the direction of flow through the passages as well as upon variations in the condition to which the automatic condition responsive valve actuating bellows 13 is responsive. The flow modulation between the passages 11 and 12 is controlled by a pair of alternatively effective spaced apart and reversed valvular members or disks 14 and 15 both carried on the stem 16 that is movably mounted in the opposite sides of split valve casing 17 by means of the sealing bellows 18 and 19 with the upper end of the stem 16 extending into operating relation with the automatic condition responsive valve actuating bellows 13. The biasing spring 21 serves to bias the upper end of the valve stem 16 into operative engagement with the central recess 13a formed in the operating end of the bellows 13.

In order to render the modulation of valve 10 automatically reversible in response to the direction of flow therethrough, the complementary interlocking double valve seat member 23 is movably mounted in the valve casing 17 in alternative correlation with the opposing valve members 14 and 15 by means of the flexible diaphragm 24 preferably formed of synthetic rubber or the like that is clamped between the opposite sides of the valve casing 17 by clamping bolts 22. The double valve seat member 23 moves between the spaced apart alternatively effective valve members 14 and 15 and is provided with reversed seats on the opposite sides thereof for alternatively cooperating with each of the reversed valve disks 14 and 15 so as to reverse the flow modulation of valve 10 dependent upon the relative position of the seat member 23. The upward movement of the valve seat member 23 is limited by the stop member 25 and the downward movement of the valve seat member 23 is limited by the stop 26.

To provide for flow modulation in different temperature ranges upon reversal in the direction of flow through the valve, the distance A within which the valve seat member 23 is movable between the stops 25 and 26 is substantially greater than the distance B within which the valve seat member 23 is movable between the opposite faces of the valve disks 14 and 15. This interlocking range changing relationship is more fully described hereinafter in connection with the heating and cooling operation of the valve.

The automatic condition responsive bellows 13 that operates the valve to regulate the flow is, in the preferred form shown, connected by means of the tube 30 with the temperature responsive bulb 31 so that upon heating of a suitable thermal liquid inside bulb 31, the bellows 13 will expand and thereby move stem 16 together with spaced apart valve disks 14 and 15 downwardly against the bias of spring 21. Upon cooling of the bulb 31, bellows 13 will contract and spring 21 will move plate 32 that is attached to the stem 16 by means of the sealing nut 33 upwardly. The bellows 13 is removably mounted in the casing 34 by means of the holding-down nut 35 and casing 34 is screw threaded outside to the cylindrical boss 36 on the upper half of the split valve casing 17. The sealing bellows 19 is removably clamped to the upper half of the split casing 17 by means of the annular nut 37 that is threaded inside the boss 36. In a similar way, sealing bellows 18 is removably clamped to the lower half of the split valve casing 17 by means of the annular clamping nut 38 threaded inside the boss 39. The end of sealing bellows 18 is removably clamped to the valve stem 16 by means of the clamping nut 40.

While not necessarily limited thereto, the improved reverse flow responsive automatic valve mechanism of Fig. 1 is particularly adapted for use in an improved reversible heating and cooling medium circulating system such as indicated schematically in Fig. 2. In the system shown each of the valves 10 reversely modulates the flow of heating and cooling medium to one of a plurality of room air conditioning units 43 and 44, with the bulb 31 responsive to the temperature of the room air flowing to the corresponding unit. The room air conditioning units 43 and 44 comprise conduits or tubes which are supplied with heating medium with the flow in one direction from a suitable heating medium supply source 45 and with cooling medium with the flow in the opposite direction from a suitable cooling medium supply source 46. A suitable motor driven circulating pump 47 serves to circulate the heating medium in one direction from the heating medium supply source 45 through supply mains 48 and 49 to the room air conditioning units 43 and 44 in parallel when the heating control valves 50 and 51 are in the open position as shown. Likewise a suitable motor-driven pump 53 serves to circulate the cooling medium in the opposite direction from the cooling medium supply source 46 through the supply mains 48 and 49 to the air conditioning units 43 and 44 in parallel whenever the cooling control valves 54 and 55 are opened. Thus when valves 50 and 51 are closed and valves 54 and 55 are opened by operation of the system changeover valve mechanism 56, the direction of flow through mains 43 and 44 as well as the automatic reversible flow regulation valves 10 will be reversed.

In order to limit the system pressure differential between the supply mains 48 and 49 provided by the centrifugal circulating pumps 47, a bypass valve 57 of the spring pressed pressure release type is interconnected between the mains 48 and 49, as shown in Fig. 2. Thus irrespective of whether the various room unit control valves 10 are closed or partially open, a substantially constant pressure differential will be maintained between the mains 48 and 49. As shown, the bypass valve 57 is preferably located near the end of the mains 48, 49 beyond the point of connection of units 43 and 44 with the mains. This insures that a supply of heating medium of proper temperature is always available to flow through any one of the room heating units whenever the thermostatic control valve 10 thereof operates to start the flow of the heating medium to the corresponding unit.

The reverse acting bypass valve 58 operates in a similar manner to the bypass valve 57 only in the opposite direction when cooling medium is reversely circulated in the mains 48 and 49. The control springs of the bypass valves 57, 58 may be adjusted so as to maintain substantially the same pressure differential between the mains 48 and 49 during both heating and cooling operation or different pressures as desired.

Where a relatively large number of units are connected with the mains 48, 49 so that there is always likely to be adequate circulation of the heating and cooling medium through the mains, a bypass valve 57' may be located adjacent the inlet and outlet of the heating medium circulating pump 47 and a reverse bypass valve 58' located adjacent the inlet and outlet of the cooling medium circulating pump 53 as indicated by the dotted lines.

*Operation of Figs. 1 and 2*

With the improved reverse flow responsive reversible thermostatic flow modulation valve of Fig. 1 connected in the improved reversible heating and cooling medium circulating system such as shown in Fig. 2, the operation is as follows. Since the heating control valves 50 and 51 are open and the cooling control valves 54 and 55 closed, heating medium is circulated by pump 47 to the air conditioning units 43 and 44 with the flow of the heating medium in a predetermined direction through the valves 10 as indicated by the solid line arrow in Fig. 1. The pressure differential provided by the circulating pump 47 is limited by the bypass valve 57. The resulting fluid pressure differential flexes diaphragam 24 to the position shown in engagement with the upper motion limit stop 25 and thus carries valve seat 23 into flow regulating relation with the upper valve disk 14. In this way relative movement of the correlated flow regulating elements of the valve is produced in response to flow in a predetermined direction so as properly to position the valve elements for flow regulation of the heating medium in a heating temperature control range.

When the room air temperature to which bulb 31 is responsive decreases into the heating temperature control range, bellows 13 contracts and spring 21 raises the valve stem 16 together with the valve disk 14 so as to provide a variable flow area between the valve seat 23 and the valve disk 14 as shown in Fig. 1. The resulting flow of heating medium through the corresponding air conditioning unit produces a heat transfer to the room sufficient to balance the heat loss.

In case the heat loss from the room decreases with a resulting increase in the room temperature, then bulb 31 will respond to expand bellows 13 and thereby move valve stem 16 and valve disk 14 downwardly to decrease the flow area between the disk 14 and the valve seat 23. As a result the flow of heating medium to the air conditioning unit will be decreased with a corresponding decrease in the heat transfer to the room so as to again balance the heat loss.

Whenever the ambient temperature conditions require cooling operation of the room air conditioning units, then the heating valves 50 and 51 are closed and the cooling valves 54 and 55 are opened by operation of the system changeover valve operating mechanism 56. This may be accomplished either manually or by a suitable automatic device responsive to the ambient temperature conditions if desired. Since the flow of the cooling medium through valve 10 is in the reverse direction as indicated by the dash line arrow in Fig. 1, the fluid pressure differential exerted upon the diaphragm 24 as limited by valve 58 will be reversed so as to move the valve seat 23 downwardly. However since the distance B limiting the free travel of the valve seat 23 between the two spaced apart valve disks 14 and 15 is less than the distance A limiting the free movement of the valve seat 23 between the two spaced apart stops 25 and 26, the valve seat 23 will engage with the valve disk 15, in case the valve stem 16 with its valve disks 14 and 15 are in the position shown in Fig. 1. As a result flow of cooling medium will be stopped since valve disk 15 will then close the port through the valve seat 23 with valve stem 16 in the position shown. Not until bulb 31 responds to an increase in room temperature from the heating control range towards the cooling control range will bellows 13 expand sufficiently to lower valve stem 16 together with valve disk 15. Valve seat 23 will move as a unit along with the valve disk 15, until after the valve seat 23 engages with the lower stop 26 at the lower limit of the cooling control range thereby arresting any further downward movement of the valve seat 23. In this way the improved reverse flow responsive reversible thermostatic valve mechanism of the present invention insures that the cooling control temperature range is separate from and above the heating control temperature range.

Upon further increase in the temperature of the room air in the cooling range, bulb 31 will respond to further expand bellows 13 and thereby continue the downward movement of the valve stem 16 and valve disk 15. Under these conditions valve disk 15 will disengage the valve seat 23 to permit the flow of cooling medium through the corresponding room air conditioning unit so as to provide cooling heat transfer from the room to balance the heat gain. Whenever the heat gain increases, bulb 31 will respond to the increased room temperature and expand bellows 13 to move valve disk 15 farther away from the valve seat 23 and thus increase the cooling heat transfer from the room to balance the heat gain. Likewise, when the heat gain decreases the room temperature will also decrease and bulb 31 will respond to contract bellows 13 and thereby reposition valve disk 15 so as to again provide the cooling heat transfer from the room required to balance the reduced heat gain.

From the above it will be seen that the improved reverse flow responsive automatic valve mechanism of the present invention effectively reverses the flow modulation characteristic of the valve and also adjusts the operating range of the thermostatic control as required in changing from heating to cooling operation automatically in response to circulation of the heating and cooling medium in opposite directions.

In the modified form of automatic reverse flow responsive valve modulation reversing mechanism embodying the present invention shown in Fig. 3, the valve casing 17a is provided with a fixed double valve seat 60 having alternative correlations with the two complementary spaced apart valve disks 14a and 15a that are carried by a spool 61 formed so as to slide upon the valve stem 62 between the stops 63 and 64 with which the stem 62 is provided. The valve disk 14a may be formed integral with the spool 61 and the valve disk 15a secured thereto by the anchoring screw 66. The other parts of the valve may be substantially the same as shown in Fig. 1.

In order to insure that the cooling temperature control range is separate from and above the heating temperature control range, the distance B representing the free movement of the two spaced apart valve disks 14a and 15a between their respective closed positions in engagement with the valve seat 60 is made less than the distance A representing the free sliding movement of the valve spool between the stops 63 and 64.

It should be noted that the directions of flow for the heating and cooling mediums through the valves as indicated by the solid line and dash line arrows in Fig. 3 are reversed from those shown in Fig. 1. Consequently when the modified form of valve shown in Fig. 3 is used in the heating and cooling medium circulating system such as shown in Fig. 2, the valve casing 17a should be connected in the opposite direction to insure proper operation.

Operation of Fig. 3

When cooling medium is supplied to the valve in the direction indicated by the dashed arrow in Fig. 3, then the fluid pressure differential will exert a force upon the sliding spool 61 so as to carry spool 61 into engagement with stop 64 and the lower valve disk 15a into correlated flow modulating relation with the valve seat 60 as shown. Under these conditions when the temperature of bulb 31 increases, bellows 13 will expand and thereby move valve stem 62 downwardly. Due to the engagement of stop 64 with the upper surfaces of the valve disk 14a, the valve spool 61 will be carried along with valve stem 62 so as to move the valve disk 15a away from the seat 60. The resulting increased flow of cooling medium will increase the cooling heat transfer from the room so as to balance the increased heat gain. Conversely when the temperature of bulb 31 decreases, bellows 13 will contract thereby enabling spring 21 to move valve stem 62 upwardly and thereby carry valve disk 15a towards the valve seat 60. In this case the resulting decrease in flow of cooling medium will balance the reduced heat gain of the room.

When heating medium is supplied to the valve in the opposite direction as indicated by the full line arrow in Fig. 3, then the fluid pressure differential exerted by the flow upon the sliding spool 61 with its spaced apart disks 14a and 15a will cause the spool 61 to slide downwardly towards the stop 63. However, with valve stem 62 and stop 63 in the position shown, valve disk 14a will engage with seat 60, thus stopping the flow as well as arresting the downward movement of spool 61 towards the stop 63. Hence, the valve disk 14a will close the port in the valve seat 60 to stop flow of heating medium until the temperature to which bulb 31 is responsive decreases into the heating modulating range. When the temperature of bulb 31 reaches the heating modulating range, bellows 13 will contract and thereby enable spring 21 to raise valve stem 62 along with stops 63 until the latter engages with the bottom of valve disk 15a. Upon any further decrease in the temperature of bulb 31, in the heating modulating range, the resulting further contraction of bellows 13 will raise valve stem 62 and stop 63 sufficiently to move the double valve spool 61 upwardly as a unit therewith. This separates the valve disk 14a from seat 60 so as to permit the flow of heating medium to the air conditioning unit in a heating temperature modulating range that is below the cooling temperature modulating range. In the heating temperature modulating range, the position of valve disk 14a is varied so as to vary the flow of heating medium and thereby vary the heat transfer to the room to balance the heat loss.

In the modification shown in Fig. 4 a single movable valve element 70 is carried on valve stem 16 and cooperates with the opposing double valve seats 71 and 72 in reversely modulating the flow of heating and cooling medium through casing 17 in opposite directions between the passages 11 and 12. The valve seat 71 is formed integral with the annular member 73 having a shoulder 74. The opposing valve seat 72 is similarly formed integral with the annular member 75 having the shoulder 76. Thus when the two annular members 73 and 75 are screw threaded together as indicated at 77 the shoulders 74 and 76 tightly clamp the flexible diaphragm 24 therebetween. Also the shoulders 74, 76 engage respectively with the stops 26 and 25 formed in the valve casing 17 when diaphragm 24 responds to the reversal of flow. The other parts of the valve may be the same as shown in Fig. 1 and heretofore described so that the valve stem 16 is operated in its downward direction upon heating of the bulb 31 connected to the bellows 13 and in its upward direction when the bellows 13 contracts.

*Operation of Fig. 4*

With the several parts in their respective position shown in Fig. 4, heating medium is being supplied to the valve casing 17 in the direction indicated by the full line arrow. Thus, the pressure differential exerted upon diaphragm 34, due to the circulation of the heating fluid, flexes the diaphragm 24 to carry shoulder 76 into engagement with stop 25 as shown. As a result, valve seat 71 is carried into flow modulating relation with the movable valve element 70. Valve element 70 is shown in engagement with the valve seat 71, thus indicating that the temperature responsive bulb 31 has responded to the desired temperature in the room to expand bellows 13 sufficient to close the flow control valve and thus stop further supply of heating medium to the room heat exchange unit, assuming the valve of Fig. 4 is used in the system shown in Fig. 2.

As the room temperature decreases, bulb 31 will respond to contract bellows 13 and thereby enable the spring 21 to move the valve stem upwardly and thereby move the movable valve element 70 away from the valve seat 71. As a result, heating medium will flow through the valve to meet the room heating demand. If the room temperature should increase, bellows 13 will expand and thereby move stem 16 and valve element 70 towards the seat 71 so as to reduce the flow of heating medium to balance the heating demand.

Whenever cooling of the room is required, cooling medium is supplied to the valve with the flow in the reverse direction as indicated by the dash line arrow with a resultant reversal of the pressure differential exerted on the diaphragm 24. Consequently, the diaphragm 24 flexes to carry the shoulder 74 towards the stop 26. However, the distance B representing the amount of free motion of the valve member 70 between the two opposing seats 71 and 72 is less than the distance A representing the amount of free motion of the double valve seat members between the stops 25 and 26. Here if the valve member 70 remains in the position shown, valve seat 72 will engage with member 70 before shoulder 74 engages with stop 26. Only after bellows 13 has further expanded so as to move valve member 70 out of the heating temperature control range and into the cooling temperature control range will the valve seat shoulder 74 engage with stop 26.

After the room temperature rises into the cooling temperature control range, the expansion of bellows 13 will then serve to move stem 16 and valve member 70 downwardly so as to disengage the valve member 70 from the valve seat 72 to modulate the flow of cooling medium through the valve to meet the cooling demand.

What I claim as new and desire to secure by Letters Patent of the United States is:

1. An automatic fluid flow regulating valve having in combination, a casing having a passage for alternative flow of heating and cooling medium in opposite directions therethrough, a pair of spaced apart jointly movable valve members having a movable double valve seat therebetween for variably restricting said passage, operating mechanism for said valve members including a thermomotive device responsive to variations in a temperature condition controlled by the flow of said medium and provided with connections for moving each of said valve members towards said seat and the other away from said seat upon variation in said condition in a corresponding direction, and a flexible diaphragm responsive to a pressure condition dependent upon the direction of flow of said medium through said passage for moving said seat towards each of said valve members upon flow in the corresponding direction.

2. A heating and cooling medium control valve having in combination a casing having a passage for alternative flow of heating and cooling medium in opposite directions therethrough, a pair of spaced apart jointly movable valve members having a double valve seat movable therebetween into engagement and disengagement with each of said valve members to variably restrict said passage, operating mechanism for jointly moving said valve members in each direction including a thermomotive device responsive to variations in a temperature condition controlled by the flow of said medium, a flexible diaphragm for sealing said seat in said casing and responsive to the reversal of flow of said medium for moving said seat towards each of said valve members upon flow in the corresponding direction, and means including spaced apart stops carried by said casing for limiting movement of said valve seat in each direction after engagement thereof with a corresponding one of said valve members intermediate said stops.

3. An automatic fluid flow regulating valve having in combination, a casing having a passage for alternative flow of heating and cooling medium in opposite directions therethrough, a pair of spaced apart interconnected jointly movable opposing valve seats having a valve member movable therebetween for controlling flow through said passage, a thermomotive device responsive to variations in a temperature condition controlled by the flow of said medium for moving said valve member towards each of said valve seats upon variation in said condition in a corresponding direction, and means including a diaphragm movable in response to the reversal of flow of said medium through said passage for moving each of said valve seats towards said movable valve member and the other seat away therefrom upon flow in the corresponding direction.

4. An automatic fluid flow regulating valve having in combination, a casing having a passage for alternative flow of heating and cooling medium in opposite directions therethrough, a pair of spaced apart interconnected jointly movable opposing valve members having a valve seat therebetween for separately controlling flow through said passage, a thermomotive device responsive to variations in a temperature condition controlled by the flow of said mediums and provided with opposed one way lost motion connections for moving either valve member towards said seat when the flow is in a corresponding direction whereby each member is responsive to the reversal of flow through said passage for placing the other of said valve members under control of said device.

5. An automatic fluid flow regulating valve having in combination a casing having a passage for alternative flow of heating and cooling medium in opposite directions therethrough, a pair of spaced apart opposing jointly movable valve seat members having a movable valve member therebetween for variably restricting said passage, operating mechanism for said valve member including a thermomotive device responsive to variations in a temperature condition controlled by the flow of said mediums and provided with connections for moving said valve member towards each of said valve seat members and away from the other valve seat member upon variation in said condition in opposite directions, and a diaphragm responsive to a pressure condition dependent upon the direction of flow of said mediums through said passage and provided with connections for moving each of said valve seat members towards said valve member upon flow in the corresponding direction.

6. An automatic fluid flow regulating valve comprising a casing having a fluid flow path therethrough, fluid flow control mechanism in said casing shiftable into either of two positions to control the flow through said path, automatic means responsive to a predetermined condition for controlling said mechanism to vary the rate of flow of fluid in one direction in one of said positions and in the other direction in the other of said positions, whereby a change of condition in the same sense has opposite effects in said two positions, and means responsive to a change in the direction of flow of the fluid through said path for shifting said mechanism from either of said positions to the other.

7. An automatic fluid flow regulating valve for effecting opposite changes in the rate of flow of a fluid under two respective conditions of the fluid, said valve comprising a casing having a fluid flow path therethrough, relatively movable port and port closing members arranged in said path and cooperating to control the flow of fluid through said casing, said members being relatively shiftable into either of two flow regulating positions, automatic means for controlling said members to regulate the flow of fluid in both said positions, and means responsive to the direction of flow of fluid through said casing for shifting said members from either of said positions to the other.

8. An automatic fluid flow regulating valve for effecting opposite changes in the rate of flow of a fluid under two respective conditions of the fluid, said valve comprising a casing having a fluid flow path therethrough, relatively movable port and port closing members arranged in said path and cooperating to control the flow of fluid through said casing, said members being relatively shiftable into either of two flow regulating positions, automatic means for controlling said members to regulate the flow of fluid in both said positions, and means responsive to the direction of flow of fluid through said casing for shifting said members from either of said positions to the other, said means including a flexible diaphragm securing one of said members to said casing.

9. An automatic fluid flow regulating valve for effecting opposite changes in the rate of flow of a fluid under two respective conditions of the fluid, said valve comprising a casing having a fluid flow path therethrough, relatively movable port and port closing members arranged in said path and cooperating to control the flow of fluid through said casing, one of said members comprising two spaced elements and being shiftable between two positions to engage corresponding portions of the other of said members, automatic condition responsive means for effecting relative movement of said members to control the rate of flow of fluid in both said positions, and means responsive to the direction of flow of the fluid for shifting said one member from either of said positions to the other.

10. An automatic fluid flow regulating valve for effecting opposite changes in the rate of flow of a fluid under two respective conditions of the fluid, said valve comprising a casing having a fluid flow path therethrough, relatively movable port and port closing members arranged in said path and cooperating to control the flow of fluid through said casing, one of said members comprising two elements having a common axis and spaced apart thereon and the other of said members being coaxial with said one member and lying on said axis intermediate said two elements, said members being shiftable along said axis between two positions for affording cooperation between said other member and respective ones of said two elements, automatic condition responsive means for effecting relative movement between said members in both of said positions whereby opposite changes in rate of flow are effected in said two positions upon a like change in the condition, and means responsive to the direction of flow of the fluid for shifting said members from either of said positions to the other.

11. A heating and cooling system comprising a heat exchanger, a source of heating fluid, a source of cooling fluid, means for connecting either of said sources alternatively to said system; said means being arranged to circulate the heating fluid through said heat exchanger in a direction opposite to that of the cooling fluid, an automatic control valve responsive to a condition dependent upon the circulation of said fluid for controlling the rate of flow through said heat exchanger, said control valve having a heating fluid control position and a cooling fluid control position, and means responsive to the direction of flow of fluid through said valve for selectively determining the control position thereof.

12. A heating and cooling system comprising a heat exchanger, a source of heating fluid, a source of cooling fluid, means for connecting either of said sources alternatively to said system, means including a changeover mechanism and a pair of pumps for selectively circulating the heating fluid and the cooling fluid through said heat exchanger in opposite directions, an automatic control valve responsive to a condition dependent upon the circulation of said fluid for controlling the rate of flow through said heat exchanger, said control valve having a heating fluid control position and a cooling fluid control position, and means responsive to the direction of flow of fluid through said valve for selectively determining the control position thereof.

13. A heating and cooling system comprising a plurality of heat exchangers connected in parallel, a source of heating fluid, a source of cooling fluid, means for connecting either of said sources alternatively to said system, said means being arranged to circulate the heating fluid through said heat exchangers in a direction opposite to that of the cooling fluid, automatic control valves for each heat exchanger responsive to a condition dependent upon the circulation of said fluid through the respective heat exchanger for controlling the rate of flow thereof, each of said control valves having a heating fluid control position and a cooling fluid control position, means responsive to a pressure condition dependent upon the direction of flow of fluid through said valves for selectively determining the control positions thereof, and means including a pressure operated valve for bypassing said fluid around said heat exchangers to maintain said pressure condition within predetermined limits.

14. An air conditioning system comprising a heat exchange tube, valve means for controlling the passage of heat exchange fluid through said tube, means for passing a heating fluid in one direction through said tube and valve means, means for passing a cooling fluid in the opposite direction through said tube and valve means, means including a thermostat in the conditioned space for opening and closing said valve means, and means responsive to the direction of flow of fluid through said valve means and tube for causing said thermostat to adjust said valve means to supply more fluid to said tube upon a rise in temperature when a cooling fluid is passed therethrough, and for causing said thermostat to adjust said valve means to supply less fluid to said tube upon a rise in temperature when a heating fluid is passed therethrough.

WILLIAM L. KNAUS.

REFERENCES CITED

The following references are of record in the file of this patent:

UNITED STATES PATENTS

| Number | Name | Date |
|---|---|---|
| Re. 22,685 | Carrier | Oct. 30, 1945 |
| 2,255,292 | Lincoln | Sept. 9, 1941 |